(12) United States Patent
Malkin et al.

(10) Patent No.: US 10,515,027 B2
(45) Date of Patent: Dec. 24, 2019

(54) STORAGE DEVICE SHARING THROUGH QUEUE TRANSFER

(71) Applicant: HEWLETT PACKARD ENTERPRISE DEVELOPMENT LP, Houston, TX (US)

(72) Inventors: Kirill Malkin, Parsippany, NJ (US); Alan Poston, Milpitas, CA (US); Matthew Jacob, Milpitas, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/793,899

(22) Filed: Oct. 25, 2017

(65) Prior Publication Data

US 2019/0121753 A1    Apr. 25, 2019

(51) Int. Cl.
| | |
|---|---|
| *G06F 13/16* | (2006.01) |
| *G06F 13/28* | (2006.01) |
| *G06F 13/40* | (2006.01) |
| *G06F 13/42* | (2006.01) |

(52) U.S. Cl.
CPC .......... *G06F 13/1642* (2013.01); *G06F 13/28* (2013.01); *G06F 13/4022* (2013.01); *G06F 13/4282* (2013.01); *G06F 2213/0026* (2013.01)

(58) Field of Classification Search
CPC ...... G06F 3/067; G06F 3/0656; G06F 3/0613; G06F 3/0659; H04L 67/1097; H04L 69/08; H04L 49/357; H04L 67/1002
USPC .............. 711/114, 147; 710/52, 39, 310, 112
See application file for complete search history.

(56) References Cited

U.S. PATENT DOCUMENTS

| | | | |
|---|---|---|---|
| 8,521,941 B2 | 8/2013 | Regula | |
| 8,553,683 B2 | 10/2013 | Regula | |
| 8,645,605 B2 | 2/2014 | Subramaniyan et al. | |
| 9,075,557 B2 | 7/2015 | Flynn et al. | |
| 9,350,806 B2 | 5/2016 | Kumar et al. | |
| 9,692,645 B2 * | 6/2017 | Banka | G06F 3/0617 |
| 2004/0068603 A1 * | 4/2004 | Augsburg | G06F 13/362 |
| | | | 710/310 |

(Continued)

FOREIGN PATENT DOCUMENTS

CN            104239249 A            12/2014

OTHER PUBLICATIONS

Don Tolmie, "Third-party SCSI data transfers," Sep. 1994, pp. 3. http://www.t10.org/pipermail/t10/1994-September/001083.html.

(Continued)

*Primary Examiner* — Faisal M Zaman (57) ABSTRACT

According to examples, an apparatus may include a memory to which a first queue and a second queue are assigned, in which a storage device is to access data task requests stored in the first queue and the second queue, in which the apparatus is to transfer the first queue to a second apparatus. The apparatus may also include a central processing unit (CPU), the CPU to input data task requests for the storage device into the second queue, in which the second apparatus is to store the first queue in a second memory of the second apparatus, and the storage device is to access data task requests from the first queue stored in the second memory of the second apparatus and data task requests from the second queue stored in the memory to cause the apparatus and the second apparatus to share access to the storage device.

20 Claims, 4 Drawing Sheets

(56) References Cited

U.S. PATENT DOCUMENTS

| | | | | |
|---|---|---|---|---|
| 2007/0028144 | A1* | 2/2007 | Graham | G06F 11/2023 714/34 |
| 2007/0118706 | A1* | 5/2007 | Pepper | G06F 3/0605 711/163 |
| 2007/0130303 | A1* | 6/2007 | Anna | G06F 11/203 709/223 |
| 2010/0250785 | A1* | 9/2010 | Shin | G06F 3/0613 710/3 |
| 2010/0325327 | A1* | 12/2010 | Marietta | G06F 13/1642 710/240 |
| 2012/0290747 | A1* | 11/2012 | Doatmas | G06F 3/0617 710/38 |
| 2013/0024595 | A1 | 1/2013 | Subramaniyan et al. | |
| 2014/0047058 | A1* | 2/2014 | Trachy | G06F 3/0605 709/212 |
| 2014/0122765 | A1 | 5/2014 | Subramaniyan et al. | |
| 2014/0237156 | A1 | 8/2014 | Regula et al. | |
| 2014/0331223 | A1 | 11/2014 | Lee et al. | |
| 2014/0372655 | A1 | 12/2014 | Moore | |
| 2016/0162422 | A1* | 6/2016 | Weber | G06F 13/28 710/308 |

OTHER PUBLICATIONS

Jiang et al., "Design and Implementation of IP-SAN Based on Third Party Transfer Protocols," 2008, 2008 ISECS International Colloquium on Computing, Communication, Control, and Management, pp. 188-192.

Ralph O. Weber, "XCOPYv2: Upgrades & RODs," Nov. 14, 2011, T10/11-459r2, pp. 173.

Stack Exchange Inc., "Do Modern Motherboards Allow a PCI-E Device to Access Ram Without Diving the CPU," (Web Page), Oct. 17, 2015, 2 pages, https://superuser.com/questions/988136/do-modem-motherboards-allow-a-pci-e-device-to-access-ram-without-involving-the.

Wikpedia, "Man-in-the-middle attack," download date May 5, 2017, pp. 5. https://en.wikipedia.org/w/index.php?title=Man-in-the-middle_attack&oldid=778705299.

Kirill Malkin, "HPC and Big Data: Better Together!," Aug. 30-Sep. 1, 2016, Smoky Mountains Computational Sciences and Engineering Conference, Gatlinburg, Tennessee.

Avago Technologies, "PEX9700 Series Switch Chips: Managed PCI Express Switches Based on ExpressFabric® Technology," Product Brief, Jun. 11, 2015, AV00-0327EN, <https://docs.broadcom.com/docs-and-downloads/docs-and-downloads/Avago-PLX-ExpressFabric-PB-AV00-0327EN.pdf>.

NVM Express, Inc., "Broadcom PEX0797 PCIe Switch Family," Sep. 7, 2017, <https://web.archive.org/web/20170907223340/https://nvmexpress.org/portfolio-items/broadcom-pex9797-pcie-switch-family/.

Prometheus Authors,"Overview," Prometheus, Aug. 4, 2017, <https://web.archive.org/web/20170804024337/ https://prometheus.io/docs/introduction/overview/>.

Stephen Bates, "p2pmem: Enabling PCIe Peer-2-Peer in Linux," Sep. 2017, (presentation slides), <https://www.snia.org/sites/default/files/SDC/2017/presentations/Solid_State_Stor_NVM_PM_NVDIMM/Bates_Stephen_p2pmem_Enabling_PCIe_Peer-2-Peer_in_Linux.pdf>.

Stephen Bates, "SDC 2017—p2pmem: Enabling PCIe Feer-2-Peer in Linux—Stephen Bates," Sep. 2017, (video transcript), <https://www.youtube.com/watch?v=zEXJ549ealM>.

* cited by examiner

STORAGE DEVICE SHARING THROUGH QUEUE TRANSFER

BACKGROUND

Peripheral Component Interconnect Express (PCI Express or PCIe) is a serialized interconnect standard that provides a foundation for a high performance, low latency converged fabric. A PCIe fabric typically includes a host processor that controls a global memory address space of a client system including compute nodes and PCIe devices, such as graphics cards and storage devices. The host processor typically allocates an address space for each of the PCIe devices in the global memory address space to enable communications with the PCIe devices.

BRIEF DESCRIPTION OF THE DRAWINGS

Features of the present disclosure are illustrated by way of example and not limited in the following figure(s), in which like numerals indicate like elements, in which.

DETAILED DESCRIPTION

A compute node may submit data task requests to a storage device by placing the data task requests into a queue or into multiple queues stored in a memory of the compute node. The data task requests may include, for instance, reading data from the storage device or writing data to the storage device. The storage device may include pointers that point to the queues and may use the pointers to identify the locations, e.g., the memory locations of the compute nodes, at which the queues are located. Typically, a storage device may have direct memory access to single compute node at any given time and thus, the storage device may not have direct memory access to other compute nodes. The compute node to which the storage device has direct memory access, e.g., the compute node on which the queues are stored, may be defined as the owner of the storage device and the owner of the queues associated with the storage device. The queues associated with the storage device may be those queues to which the storage device stores pointers.

Disclosed herein are apparatuses, e.g., compute nodes, hosts, etc., that may share access to a common storage device or common storage devices with other apparatuses, e.g., compute nodes, hosts, etc., and methods for implementing the apparatuses. Also disclosed herein are switch fabrics that may include the apparatuses that may share access to the common storage device or devices as well as a switch that may facilitate the sharing of the common storage device or devices among the apparatuses. As discussed in greater detail herein, the apparatuses may share the common storage device or devices through transfer or lending of queues associated with the storage device or devices to a borrowing apparatus. That is, for instance, a lending apparatus that owns a queue associated with a storage device may transfer or lend the queue to a borrowing apparatus. The borrowing apparatus may use the queue to submit data task requests, e.g., I/O packets, into the queue, from which the storage device may access the data task requests. In this regard, the borrowing apparatus may use the borrowed queue to submit the data task requests directly to the storage device even though the borrowing apparatus is not the owner of the storage device.

Following the transfer of the queue to the borrowing apparatus, the lending apparatus may cease to insert data task requests into the transferred or lent queue. The lending apparatus may transfer additional queues to other borrowing apparatuses such that the other borrowing apparatuses may all share access to the storage device. Moreover, the lending apparatus may retain a queue associated with the storage device such that the lending apparatus may also share in the access to the storage device. However, in other examples, the lending apparatus may not retain any of the queues associated with the storage device and may thus function as a management controller of the storage device. In these examples, the lending apparatus may retain an administrative queue to the storage device.

According to examples, the apparatuses may communicate with the storage device or devices via a switch. The switch may be a PCIe switch and the switch fabric in which the apparatuses and the switch are included may be a PCIe fabric. In any regard, the switch may implement functions to enable data to be routed properly among the apparatuses and the storage device or devices. For instance, in response to receipt of a data transfer request from a particular storage device corresponding to data stored at a particular memory address, the switch may determine which of a plurality of apparatuses to which the data transfer request is to be sent based on a mapping of the particular address and the apparatuses. In addition, in response to receipt of a data transfer completion signal from a storage device, such as a doorbell interrupt, the switch may determine which of the apparatuses to which the interrupt is to be sent based on a mapping of the interrupt address to which the data transfer completion signal is to be sent and the apparatuses. As discussed herein, the switch may be programmed to implement address traps to route the data among the apparatuses and the storage devices.

Through implementation of the apparatuses, switch fabrics, and methods disclosed herein, storage devices may be shared among a plurality of apparatuses (compute nodes) such that the apparatuses may have direct memory access to the storage devices. That is, the apparatuses may have shared access to the storage devices through transfer of queues associated with the storage devices from owner apparatuses and through operation of the switch disclosed herein. In one regard, the shared access may enable the apparatuses, as well as multiple CPUs in the apparatuses, to concurrently submit requests for the storage device or storage devices to execute. In other regard, the transfer of the queues may enable a borrowing apparatus to continue to access a storage device that a lending apparatus may own. In a further regard, the apparatuses may implement third party transfers in which, for instance, data task requests for a first apparatus may be set up or requested by a second apparatus. In other words, a first apparatus may set up a data transfer from a storage device for a second apparatus without using an intermediary.

Before continuing, it is noted that as used herein, the terms "includes" and "including" mean, but is not limited to, "includes" or "including" and "includes at least" or "including at least." The term "based on" means "based on" and "based at least in part on." In addition, a "queue" may also be termed a "submission/completion queue."

Figure 1:
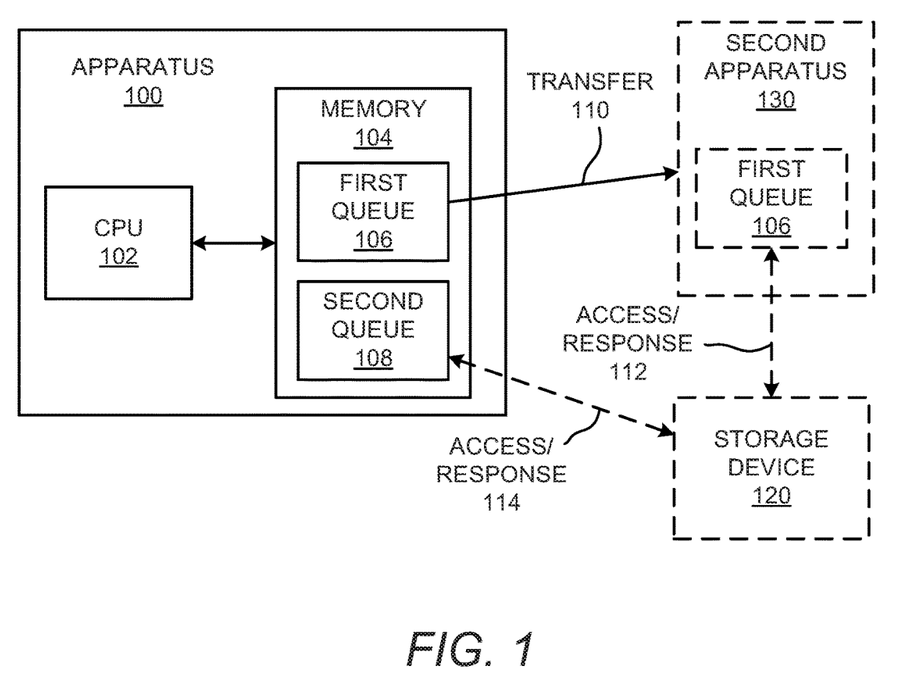
FIG. 1 shows a block diagram of an example apparatus that may share access to a storage device with a second apparatus through queue transfer.

With reference first to FIG. 1, there is shown a block diagram of an example apparatus 100 that may share access to a storage device 120 with a second apparatus 130 through a queue transfer. It should be understood that the example apparatus 100 depicted in FIG. 1 may include additional features and that some of the features described herein may be removed and/or modified without departing from a scope of the apparatus 100.

The apparatus 100 may be a compute node or a host, such as a computing device, a server, or the like. In addition, the apparatus 100 may include a central processing unit (CPU) 102 and a memory 104. The CPU 102 may be electronic circuitry that carries out the instructions of a computer program. The CPU 102 may be a microprocessor and may be contained on an integrated circuit (IC) chip. In some examples, the CPU 102 may be a core on an integrated circuit chip. The memory 104 may be an electronic, magnetic, optical, or other hardware device on which information for use by the CPU 102 may be stored. The memory 104 may be non-volatile memory, such as any of flash memory, non-volatile random access memory (NVRAM), or the like, or may be volatile memory, such as any of dynamic random-access memory (DRAM), static random-access memory (SRAM), or the like.

The memory 104 may also have stored thereon a first queue 106 and a second queue 108. Although not shown, the memory 104 may also store additional queues, such as an administrator queue as well as other queues similar to the first and second queues 106, 108. The first queue 106 and the second queue 108 may be respective data structures that occupy fragments or portions of the memory 104. The first queue 106 and the second queue 108 may be queues into which the CPU 102 may insert data task requests for a storage device 120 to execute. By way of example, the first and second queues 106, 108 may describe the blocks of data to which data task requests are to go, the addresses in the memory 104 that the blocks of data are to go to or be obtained from, the types of data tasks that are requested to be performed, etc.

Particularly, for instance, an application that the CPU 102 executes may store the data task requests into the first queue 106 and/or the second queue 108. The data task requests may include requests to store data in the storage device 120, requests to read data from the storage device 120, and requests to overwrite data in the storage device 120. The storage device 120 may respectively scan the first queue 106 and the second queue 108 to identify the data task requests that have been inserted into the first queue 106 and the second queue 108. The storage device 120 may scan the first queue 106 and the second queue 108 through communication of scanning packets respectively directed to the first queue 106 and to the second queue 108.

The apparatus 100 and the storage device 120 may be configured, e.g., programmed, such that the apparatus 100 may have sole ownership of the storage device 120. That is, the storage device 120 may be programmed to solely accept data task requests from the apparatus 100, and particularly, the first queue 106 and the second queue 108 stored in the apparatus 100. In addition, the apparatus 100 may be programmed to solely submit the data task requests to the storage device 120. That is, other apparatuses, including a second apparatus 130, may not be programmed to have access, e.g., direct memory access, to the storage device 120.

The storage device 120 and the apparatus 100 may be programmed during an initial configuration of a network including the storage device 120 and the apparatus 100 or as changes occur in the network. The storage device 120 and the apparatus 100 may also be programmed following a change to the network, e.g., the addition/removal of a storage device, the addition/removal of an apparatus, etc.

According to examples, the apparatus 100 may transfer the first queue 106 to a second apparatus 130 as indicated by the arrow 110. That is, the second apparatus 130 and storage device 120 may be provided with configuration information for the second apparatus 130 to store the first queue 106 in a memory of the second apparatus 130, and storage device 120 to point to that queue 106. In this regard, the second apparatus 130 may directly submit data task requests to the storage device 120 through insertion of the data task requests into the first queue 106 now stored in a memory of the second apparatus 130. The second apparatus 130 may also directly receive responses to the data task requests from the storage device 120. The access and the response between the first queue 106 in the second apparatus 130 and the storage device 120 is denoted by the arrow 112.

The apparatus 100 may be construed as lending the first queue 106 to the second apparatus 130. Likewise, the second apparatus 130 may be construed as borrowing the first queue 106 from the apparatus 100. In this regard, the apparatus 100 may be construed as a lending apparatus, the second apparatus 130 may be construed as a borrowing apparatus, and the transferred first queue 106 may be considered herein as a lent queue or a borrowed queue.

The first apparatus 100 may maintain the second queue 108 and may thus continue to have access to the storage device 120 through submission of data task requests to the storage device 120 via the second queue 108. The access by the storage device 120 to the data task requests in the second queue 108 and the responses to the data task requests is denoted by the arrow 114. According to examples, the apparatus 100 and the second apparatus 130 may share access to the storage device 120 in that both the apparatus 100 and the second apparatus 130 may submit data task requests to the same storage device 120. In this regard, although the apparatus 100 may have sole ownership of the storage device 120, the storage device 120 may also direct memory access to the second apparatus 130. In addition, both the apparatus 100 and the second apparatus 130 may each have access to the entire storage capacity of the storage device 120.

According to examples, the apparatus 100 may have additional queues (not shown) through which the storage device 120 is to access data task requests. The additional queues may be transferred to other apparatuses in similar manners to the transfer of the first queue 106 to the second apparatus 130 to thus enable the other apparatuses to share access to the storage device 120 with the apparatus 100 and the second apparatus 130. In addition, or in other examples, a queue for another storage device (not shown) may be transferred to the apparatus 100 from another apparatus that has ownership over the other storage device. In these examples, the other storage device may have direct memory access to the apparatus 100 through the queue transferred to the apparatus 100. As such, for instance, the apparatus 100 may have access to multiple storage devices 120 through multiple queues stored in the memory 104.

Figure 2:
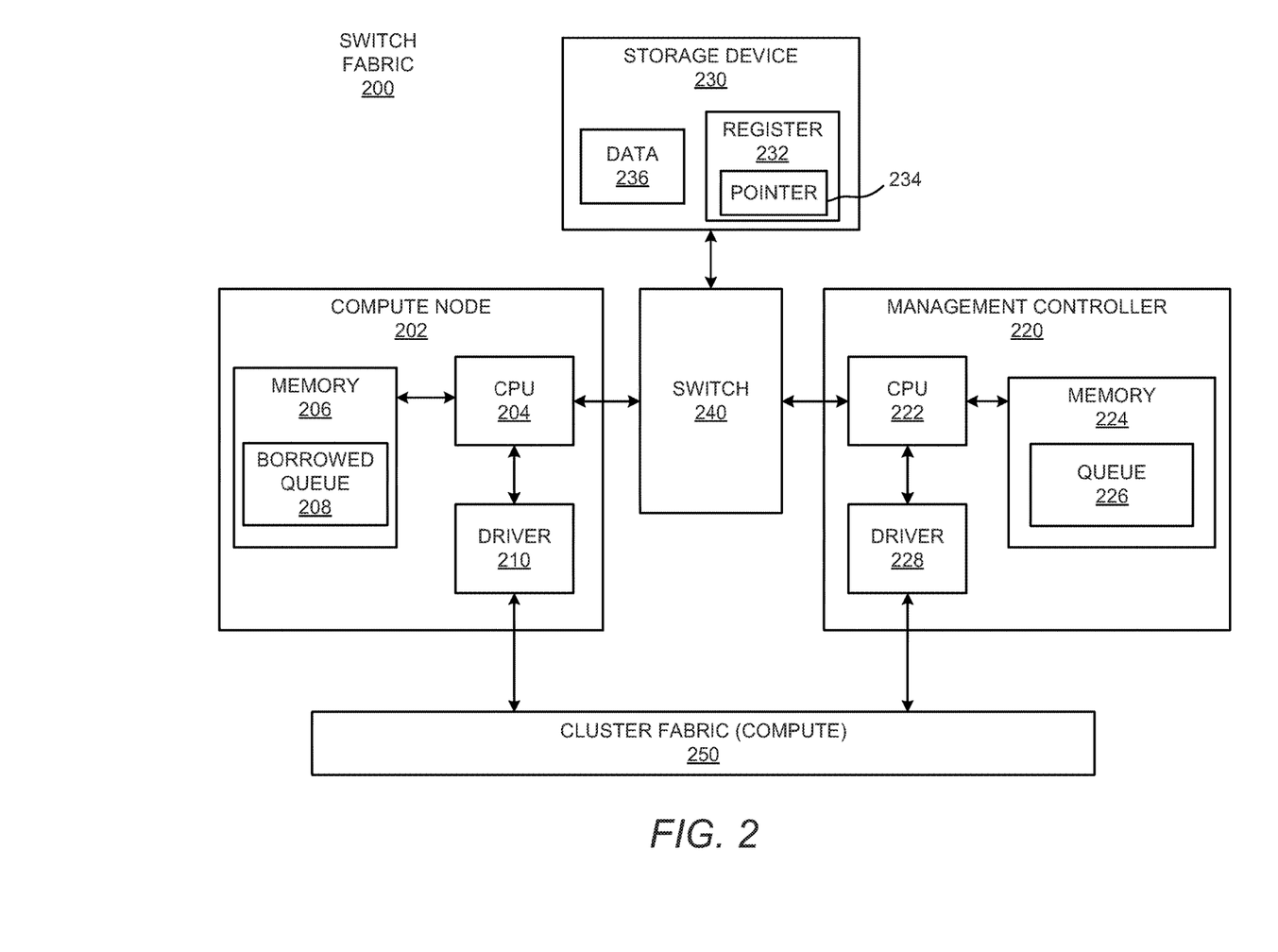
FIG. 2 shows a block diagram of an example switch fabric for enabling shared access to a storage device by multiple apparatuses.

Turning now to FIG. 2, there is shown a block diagram of a switch fabric 200 for enabling shared access to a storage device by multiple apparatuses. It should be understood that the example switch fabric 200 depicted in FIG. 2 may include additional features and that some of the features described herein may be removed and/or modified without departing from a scope of the switch fabric 200.

As shown in FIG. 2, the switch fabric 200 may include a compute node, a management controller 220, a storage device 230, and a switch 240. The compute node 202 may have a CPU 204 and a memory 206. Generally speaking, the compute node 202 may be a node in a fabric, e.g., a computing device, a server computer, a host, or the like. The CPU 204 may be electronic circuitry within the compute node 202 that carries out the instructions of a computer program in the compute node 202. The memory 206 may be non-volatile memory, such as any of flash memory, non-volatile random access memory (NVRAM), or the like, or may be volatile memory, such as any of dynamic random-access memory (DRAM), static random-access memory (SRAM), or the like. The management controller 220 may be equivalent to the apparatus 100 and the compute node 202 may be equivalent to the second apparatus 130 discussed above with respect to FIG. 1.

The management controller 220 may include a CPU 222 and a memory 224. The CPU 222 may be electronic circuitry within the management controller 220 that carries out the instructions of a computer program in the management controller 220. The memory 224 may be non-volatile memory or may be volatile memory. In some examples, the management controller 220 may be a computing device that is similar to the compute node 202. In some examples, the management controller 220 may differ from the compute node 202 in that the management controller 220 may not submit data task requests to a storage device 230, but instead, may manage the transfer of queues to enable the compute node 202 and/or a plurality of compute nodes 202 to have access to the storage device 230 via the switch 240. For instance, and as discussed in greater detail herein, the management controller 220 may transfer, e.g., lend on a temporary basis, queues to the compute node(s) 202 from which the storage device 230 accepts data task requests.

The storage device 230 may be a non-volatile memory, such as a solid-state drive, a non-volatile memory express (NVMe), a hard disk drive, or the like. The storage device 230 may include a register 232 on which a pointer 234 may be stored. The pointer 234 may point to a queue that is to store data task requests for the storage device 230 to execute. The storage device 230 may also store data 236 corresponding to a data task request. It should be understood that the storage device 230 has been depicted in a simplified manner and that the storage device 230 may thus include additional components without departing from a scope of the switch fabric 200 depicted in FIG. 2. According to examples, the storage device 230 may include a register containing a pointer to each of a plurality of queues from which the storage device 230 may access data task requests.

The management controller 220 may have ownership of the storage device 230. That is, the management controller 220 and the storage device 230 may be configured, programmed, or the like, such that the storage device 230 accepts data task requests solely from a queue 226 assigned to the management controller 220 or from multiple queues assigned to the management controller 220. In addition, the management controller 202 may have ownership of the storage device 230 through configuration, programming, or the like, of the management controller 220 and the storage device 230 to return completion responses, e.g., doorbell interrupts, responses to requests, data packets, or the like, to the accepted data task requests solely to the queue 226 or queues assigned to the management controller 220. In this regard, submission of data task requests and receipt of responses to the data task requests may be available to the queue 226 and not to queues stored on other compute nodes.

The storage device 230 may accept data task requests from the queue(s) 226 assigned to the management controller 220 through setting of pointers in the storage device 230 to point to the queue(s) assigned to the management controller 220. That is, for instance, the pointer 234 in the register 232 of the storage device 230 may point to an identifier assigned to the queue 226, in which the queue 226 may, at least initially, be assigned to the management controller 220. Although particular reference is made herein to the queue 226 being assigned an identifier, it should be understood that the queue 226 may equivalently be distinguished from other queues and/or other devices, through another type of feature, such as an address of the queue 226.

According to examples, the queue 226 assigned to the management controller 220 may be assigned to the compute node 202. That is, the queue 226 may be transferred to the compute node 202. As shown in FIG. 2, the transferred queue 208, which is labeled as a borrowed queue 208, may be stored in the memory 206 of the compute node 202. The borrowed queue 208 stored in the memory 206 of the compute node 202 may be termed a borrowed queue 208 because the queue 208 may be borrowed from the management controller 220. That is, the management controller 220 may retain ownership of the queue 208, but may lend the queue 208 to the compute node 202. Thus, the borrowed queue 208 may be returned to the management controller 220 in response to the compute node 202 failing, the compute node 202 no longer seeking direct access to the storage device 230, revocation of the queue 208 to the compute node 202, or the like.

The management controller 220 may transfer the queue 226 to the compute node 202 through coordination between a driver 228 of the management controller 220 and a driver 210 of the compute node 202. The driver 228 may coordinate the transfer of the queue 226 with the driver 210 through implementation of, for instance, a remote procedure call via a cluster fabric (compute) 250. Thus, for instance, the driver 228 in the management controller 220 may cause the driver 210 in the compute node 202 to configure a portion of the memory 206 to function as the queue 226, e.g., the borrowed queue 208. For instance, the driver 228 may send location information of the storage device 230 to the driver 210, which may include an address on the switch fabric 200, and a sequence number(s) of the queue(s) that is being transferred. Generally speaking, the driver 228 may send sufficient information to the driver 210 to enable the compute node 202 to use the queue(s) by programming the pointers to the queue(s) in the storage device registers as well as process I/O completion interrupts.

Following transfer of the queue 226 to the compute node 202, the pointer 234 to the queue 226 stored in the register 232 may point to the borrowed queue 208 stored in the memory 206 of the compute node 202. The identifier assigned to the queue 226 may not be changed when the queue 226 is transferred to the compute node 202. Accordingly, for instance, the pointer 234 stored in the storage device 230 may not be modified, but instead, may point to the same identifier both prior to and following the transfer of the queue 226. In one regard, the storage device 230 may not be notified of the queue transfer and may operate in similar fashion both before and after the queue transfer. Instead, as discussed herein, the switch 240 may facilitate proper forwarding of data among the compute node 202, the management controller 220, and the storage device 230.

The switch 240 may include multiple ports through which the switch 240 may receive data from multiple nodes, e.g., multiple compute nodes 202, the storage device 230, the management controller 220, etc., and may route data to other nodes in the switch fabric 200. Particularly, for instance, the switch 240 may receive data, e.g., in the form of data packets from a source node and may process the received data to determine the destination node for the data. The switch 240 may also forward the data to the determined destination node through a port to which the destination node is connected. According to examples, the switch 240 may function under the PCIe standard and may thus be a PCIe fabric switch.

As discussed herein, the switch 240 may be programmed, configured, or the like, to forward queue scanning requests from the storage device 230 to the borrowed queue 208 stored in the compute node 202 instead of the management controller 220. Thus, the switch 240 may be programmed or configured to direct traffic from the storage device 230 intended for the queue 226 to the borrowed queue 208 through, for instance, address traps, identifiers, etc. As discussed herein, the storage device 230 may not be informed of the transfer of the queue 226 to the compute node 202. As such, the storage device 230 may send a scanning request for data stored in the queue 226, e.g., based on the pointer 234, to the identifier assigned to the queue 226. The switch 240 may be programmed or configured to direct the scanning request to the borrowed queue 208 stored in the compute node 202. For instance, the switch 240 may be programmed with an address trap such that when data having a certain identifier, e.g., a particular destination address, set for the queue 226 is received, the switch 240 may determine that the data is to be forwarded to the compute node 202 instead of the management controller 220. Likewise, the switch 240 may use address traps to forward other data, such as completion responses, responses to data task requests associated with the borrowed queue 208, etc., to the compute node 202. In addition or in other examples, the queue pointer 234 stored in the registry 232 of the storage device 230 may be reprogrammed to a new address that is forwarded to the compute node 202 via address traps. Although a single switch 240 has been depicted in FIG. 2, it should be understood that the switch fabric 200 may include multiple switches 240, a switch with multiple chips, etc.

Figure 3:
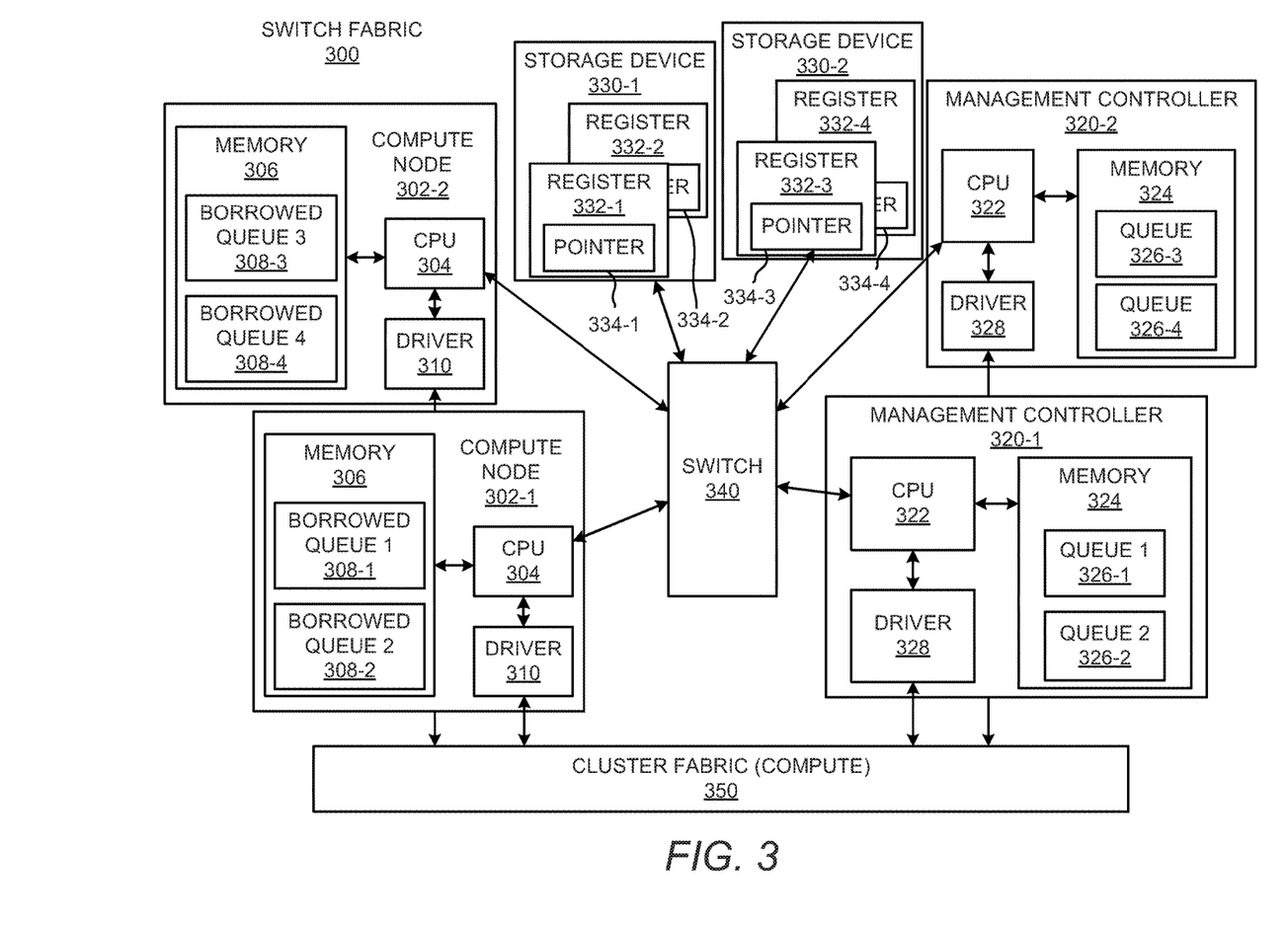
FIG. 3 shows a block diagram of an example switch fabric for enabling shared access to multiple storage devices by multiple apparatuses.

It should be understood that the switch fabric 200 has been depicted and described with respect to a single compute node 202, a single storage device 230, and a single switch 240 for purposes of simplicity. As such, the switch fabric 200 may include any number of compute nodes 202, storage devices 230, and/or switches 240. An example switch fabric 300 having a first compute node 302-1, a second compute 302-2, a first management controller 320-1, a second management controller 320-2, a first storage device 330-1, a second storage device 330-2, and a switch 340 is depicted in FIG. 3. Each of the compute nodes 302-1 and 302-2 may include a CPU 304, a memory 306, and a driver 310, which may respectively be equivalent to the CPU 204, the memory 206, and the driver 210 discussed above with respect to the switch fabric 200 depicted in FIG. 2. Each of the management controllers 320-1 and 320-2 may include a CPU 322, a memory 324, and a driver 328, which may respectively be equivalent to the CPU 222, the memory 224, and the driver 228 discussed above with respect to the management controller 220 in the switch fabric 200 depicted in FIG. 2. In addition, each of the storage devices 330-1 and 330-2 may be equivalent to the storage device 230 discussed above with respect to the switch fabric 200 depicted in FIG. 2.

Similarly to the management controller 220 depicted in FIG. 2, the first management controller 320-1 may have ownership over the first storage device 330-1 and the second management controller 320-2 may have ownership over the second storage device 330-2. In this regard, the first management controller 320-1 may have ownership of a first queue 326-1 and a second queue 326-2 from which the first storage device 330-1 is to collect data task requests. For instance, the first storage device 330-1 may include a first pointer 334-1 that points to the first queue 326-1 and a second pointer 334-2 that points to the second queue 326-2.

The second management controller 320-2 may have ownership of a third queue 326-3 and a fourth queue 326-4 from which the second storage device 330-2 is to collect data task requests. For instance, the second storage device 330-2 may include a third pointer 334-3 that points to the third queue 326-3 and a fourth pointer 334-4 that points to the fourth queue 326-4. Furthermore, the first management controller 320-1 and the second management controller 320-2 may transfer or lend the queues 326-1 to 326-4 to either or both of the compute nodes 302-1 and 302-2 in any of the manners discussed above with respect to the management controller 220.

According to examples, the first management controller 320-1 may transfer the first queue 326-1 and the second queue 326-2 to the first compute node 302-1. In these examples, the first compute node 302-1 may store a first borrowed queue 308-1 and a second borrowed queue 308-2 in the memory 306 of the first compute node 302-1, in which the first borrowed queue 308-1 corresponds to the first queue 326-1 and the second borrowed queue 308-2 corresponds to the second queue 326-2. In addition, the second management controller 320-2 may transfer the third queue 326-3 and the fourth queue 326-4 to the second compute node 302-2. The second compute node 302-2 may store a third borrowed queue 308-3 and a fourth borrowed queue 308-4 in the memory 306 of the second compute node 302-2, in which the third borrowed queue 308-3 corresponds to the third queue 326-3 and the fourth borrowed queue 308-4 corresponds to the fourth queue 326-4. In these examples, the first node 302-1 may have access to the first storage device 330-1 and the second node 302-2 may have access to the second storage device 330-2.

According to other examples, the first management controller 320-1 may transfer the first queue 326-1 to the first compute node 302-1 and may transfer the second queue 326-2 to the second compute node 302-1. In addition, the second management controller 320-1 may transfer the third queue 326-3 to the first compute node 302-1 and may transfer the fourth queue 326-4 to the second compute node 302-1. In these examples, the first compute node 302-1 may store a first borrowed queue 308-1 as corresponding to the first queue 326-1 and a second borrowed queue 308-2 as corresponding to the third queue 326-3. In addition, the second compute node 302-2 may store a third borrowed queue 308-3 as corresponding to the second queue 326-2 and a fourth borrowed queue 308-4 as corresponding to the fourth queue 326-4. In these examples, the first node 302-1 and the second node 302-2 may share access to both the first storage device 330-1 and the second storage device 330-2.

The switch 340, which may be a PCIe fabric switch, in which case the switch fabric 300 may be a PCIe fabric, may implement various operations to properly route data (e.g., packets) between the compute nodes 302-1 and 302-2 and the storage devices 330-1 and 330-2. As discussed above, the switch 340 may be programmed to implement address traps. For instance, the switch 340 may receive a request from an application running on the first compute node 302-1 to access data at a certain address and the switch 340 may use the address traps to convert that certain address into a routing from a certain target storage device 330-1 based on an established routing map. The certain address may be a virtual address of the data and the switch 340 may route the request from the target storage device 330-1 and the target compute node 302-1 may determine the physical address of the data corresponding to the virtual address of the data. The target storage device 330-1 may use the physical address to access and perform a requested task on the requested data.

As the switch 340 may route all of the traffic from the storage devices 330-1 and 330-2, the storage devices 330-1 and 330-2 may not be informed of the transfer of the queues 326-1 to 326-4. Instead, the pointers 334-1 to 334-4 stored in the storage devices 330-1 and 330-2 may continue to point to the same queues 326-1 to 326-4, but the switch 340 may route traffic from the storage devices 330-1 and 330-2 to the compute nodes 302-1 and 302-2 to which the queues 326-1 to 326-4 have been transferred. In other words, the switch 340 disclosed herein may facilitate the sharing of multiple storage devices 330-1, 330-2 by multiple compute nodes 302-1, 302-2 in a switch fabric 300. In addition, the switch 340, through implementation of the address traps or other types of routing protocols, may enable third party transfers in which, for instance, data task requests for the first compute node 302-1 may be set up or requested by the second compute node 302-2. In other examples, the pointers 334-1 to 334-4 may be updated when the respective queues 326-1 to 326-4 to which the pointers 334-1 to 334-4 point are transferred.

Through implementation of the fabric switch 300 as a PCIe fabric, the switch 340 may arbitrarily map the storage devices 330-1 and 330-2 and the compute nodes 302-1 and 302-2 with each other statically. That is, the mapping of the compute nodes 302-1 and 302-2 and the storage devices 330-1 and 330-2 may be defined statically. The fabric switch 300 may also allow transfers to be performed on behalf of some other compute node or some other device. Thus, for instance, the first compute node 302-1 may start a transfer of data, e.g., start sending data into a particular memory range of the first storage device 330-1, and the memory range may end up with the second compute node 302-2. As such, transfers of data may be performed without an intermediary. In other words, if the data is to be sent to a particular compute node but the awareness of the fact that the data is to be sent was raised on another compute node, then that request may not need to be forwarded to the compute node that will ultimately receive the data. Instead, the request may be forwarded to the storage device and then the storage device may be instructed to send the data to the given address range without any additional intermediaries. This may improve performance and latency of this type of data transfer.

Figure 4:
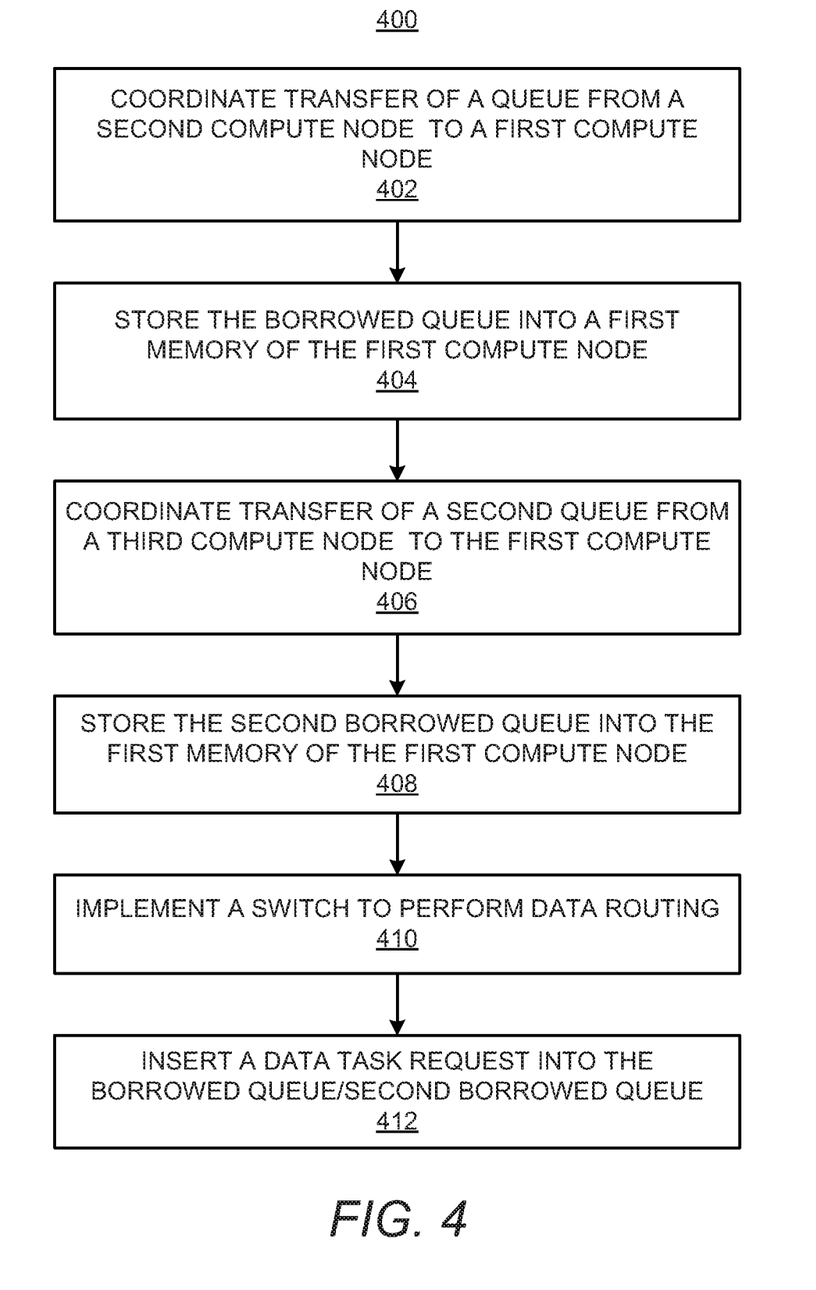
FIG. 4 depicts a flow diagram of an example method for implementing a switch fabric to cause multiple compute nodes to share access to a storage device or to multiple storage devices.

Various manners in which the components in the switch fabric 300 may operate are discussed in greater detail with respect to the method 400 depicted in FIG. 4. Particularly, FIG. 4 depicts a flow diagram of an example method 400 for implementing a switch fabric to cause multiple compute nodes 302-1, 302-2 to share access to a storage device 330-1 or to multiple storage devices 330-2. It should be understood that the method 400 depicted in FIG. 4 may include additional operations and that some of the operations described therein may be removed and/or modified without departing from scope of the method 400. The description of the method 400 is made with reference to the features depicted in FIGS. 1-3 for purposes of illustration. In addition, references made to a second node are intended to equivalently be directed to the first management controller 320-1 and references made to a third node are intended to equivalently be directed to the second management controller 320-2.

At block 402, transfer of a first queue 326-1 may be coordinated between a first driver 310 in a first compute node 302-1 and a second driver 328 in a second compute node 320-1. The second driver 328 may coordinate the transfer of the queue 326-1 with the driver 310 through implementation of, for instance, a remote procedure call via a cluster fabric (compute) 350. Thus, for instance, the driver 328 in the second compute node 320-1 may cause the driver 310 in the first compute node 302-1 to configure a portion of the memory 306 to function as the queue 326-1, e.g., may configure a portion of the memory 306 to store a first borrowed queue 308-1, as indicated at block 404. For instance, the second driver 328 may send location information of the storage device 330-1 to the first driver 310, which may include an address on the switch fabric 300, and a sequence number(s) of the queue(s) that is being transferred. Generally speaking, the second driver 328 may send sufficient information to the first driver 310 to enable the first compute node 302-1 to use the queue(s) by programming the pointers to the queue(s) in the storage device registers as well as process I/O completion interrupts.

At block 406, transfer of a third queue 326-3 may be coordinated between the first driver 310 in the first compute node 302-1 and a third driver 328 in a third compute node 320-2. The third driver 328 may coordinate the transfer of the third queue 326-3 with the driver 310 through implementation of, for instance, a remote procedure call via the cluster fabric (compute) 350. Thus, for instance, the third driver 328 in the third compute node 320-2 may cause the driver 310 in the first compute node 302-1 to configure another portion of the memory 306 to function as the queue 326-3, e.g., may configure a portion of the memory 306 to store a second borrowed queue 308-2, as indicated at block 408.

At block 410, a switch 340 may be implemented to perform data routing between the first storage device 330-1 and the compute nodes 302-1 and 302-2. For instance, the switch 340 may receive a request for access to data having an address in a range of the first compute node 302-1. The switch 340 may determine, for instance, based on a mapping of memory addresses and the storage device 330-1 that the request is to be sent to the first compute node 302-1. In addition, the switch 340 may send the request to the second compute node 302-2. As another example, the switch 340 may receive a response from the storage device 330-1 having an address in the range to the first compute node 302-1. The switch 340 may determine, for instance, based on a mapping of addresses of compute nodes 302-1, 302-2, that the response is to be sent to the first compute node 302-1. In addition, the switch 340 may send the response to the second compute node 302-2.

At block 412, a CPU 304 of the first compute node 302-1 may insert a data task request in the first borrowed queue 308-1 for execution by a first storage device 330-1. In addition, or alternatively, the CPU 304 of the first compute node 302-1 may insert a data task request in the second borrowed queue 308-2 for execution by a second storage device 330-2.

The method 400 may be expanded to encompass additional compute nodes and additional storage devices. For instance, a fourth compute node 302-2 may borrow queues from the second node 320-1 and the third node 320-2 to access the first and second storage devices 330-1 and 330-2. In addition or in other examples, the first compute node 302-1 may borrow queues associated with other storage devices to thus access those other storage devices.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An apparatus comprising:
    a memory to which a first queue and a second queue are assigned, wherein a storage device is to access data task requests stored in the first queue and the second queue, wherein the apparatus is to transfer the first queue to a second apparatus; and
    a central processing unit (CPU), the CPU to input data task requests for the storage device into the second queue, wherein the second apparatus is to store the first queue in a second memory of the second apparatus, and wherein the storage device is to access data task requests from the first queue stored in the second memory of the second apparatus and data task requests from the second queue stored in the memory to cause the apparatus and the second apparatus to share access to the storage device.

2. The apparatus of claim 1, wherein a second queue on which the CPU is to input data task requests for the storage device is stored on the memory, wherein the storage device is to access the data task requests of the CPU from the second queue.

3. The apparatus of claim 1, wherein the memory has stored thereon a borrowed queue for the CPU to input second data task requests and wherein a second storage device is to access the second data task requests from the borrowed queue.

4. The apparatus of claim 3, wherein the CPU is to submit a data task request on behalf of another apparatus to a switch, wherein the switch is to forward the data task request to the storage device, receive a response to the data task request from the storage device, and send the response to the other apparatus.

5. The apparatus of claim 1, further comprising:
    a driver to transfer the first queue to the second apparatus through coordination with a second driver of the second apparatus.

6. A method comprising:
    storing, in a first memory of a first compute node, a borrowed queue that is owned by a second compute node, the borrowed queue to store data task requests for a storage device to execute, and wherein the second compute node transferred the borrowed queue to the first compute node; and
    inserting, by a first central processing unit (CPU) of the first compute node, a data task request in the borrowed queue for the storage device to execute to cause the first compute node and the second compute node to share direct access to the storage device.

7. The method of claim 6, further comprising:
    prior to storing the borrowed queue, coordinating, by a first driver in the first compute node with a second driver in the second compute node, transfer of the borrowed queue from the second compute node to the first compute node over a cluster fabric, wherein the storage device is to scan the borrowed queue for stored data task requests of the first CPU.

8. The method of claim 7, further comprising:
    communicating, from the storage device, a scanning packet from the storage device to scan the borrowed queue for a data task request, the scanning packet having a destination address of the borrowed queue;
    receiving, by a switch, the communicated scanning packet;
    determining, by the switch, that the scanning packet is to be forwarded to the first compute node; and
    forwarding the scanning packet to the first memory of the first compute node.

9. The method of claim 8, further comprising:
    receiving, by the switch, the data task request inserted in the borrowed queue stored in the first memory;
    communicating, by the switch, the received data task request to the storage device; and
    receiving, by the switch, a response to the data task request from the storage device, and forwarding the response to the first compute node.

10. The method of claim 6, further comprising:
    inserting, by a second CPU of the second compute node, a second data task request in a second queue stored on a second memory of the second compute node;
    receiving, via a switch, a scanning packet for the second queue from the storage device;
    communicating, via the switch, the second data task request to the storage device.

11. The method of claim 6, further comprising:
    storing, in the first memory of the first compute node, a second borrowed queue that is owned by a third compute node, the second borrowed queue to store data task requests for a second storage device to execute, and wherein the third compute node transferred the second borrowed queue to the first compute node.

12. The method of claim 6, further comprising:
submitting, by the first compute node, a data task request on behalf of another compute node to a switch, wherein the switch is to forward the data task request to the storage device, receive a response to the data task request from the storage device, and send the response to the other compute node.

13. The method of claim 6, further comprising:
implementing, by a switch, address traps to route packets between the first compute node and the storage device.

14. A switched fabric comprising:
a compute node having a first memory and a first central processing unit (CPU), the first memory storing a borrowed queue, the borrowed queue being owned by a management controller and transferred from the management controller to the compute node, the first CPU to input data task requests into the borrowed queue for a storage device to execute by accessing the data task requests using a pointer to the borrowed queue stored in the storage device; and
wherein the compute node is to implement the borrowed queue to have access to storage capacity of the storage device.

15. The switched fabric of claim 14, further comprising:
the management controller, the management controller having a second memory and a second CPU, the management controller to lend the borrowed queue from the second memory to the first memory of the first compute node; and
the second memory storing a second queue, the second CPU to input data task requests for the storage device to execute in the second queue.

16. The switched fabric of claim 15, further comprising:
a switch to route packets intended for the borrowed queue to the first compute node and to route packets intended for the second queue to the management controller.

17. The switched fabric of claim 16, wherein the switch is to determine whether to route packets to the first compute node or the second compute node through a mapping of the destination addresses of the packets to one of the first compute node or the second compute node.

18. The switched fabric of claim 16, wherein the switch is to determine intended destinations of the packets through implementation of address traps on addresses of the packets.

19. The switched fabric of claim 14, further comprising:
the storage device;
a second storage device;
the first memory storing a second borrowed queue, the first CPU to input data task requests for the second storage device to execute in the second borrowed queue, the second storage device storing a second pointer to the second borrowed queue.

20. The switched fabric of claim 14, wherein the first CPU is to submit a data task request to a switch, wherein the data task request is for data to be transferred to another compute node, wherein the switch is to forward the data task request to the storage device, receive a response to the data task request from the storage device, and send the response to the other compute node.

* * * * *